Figure 1:
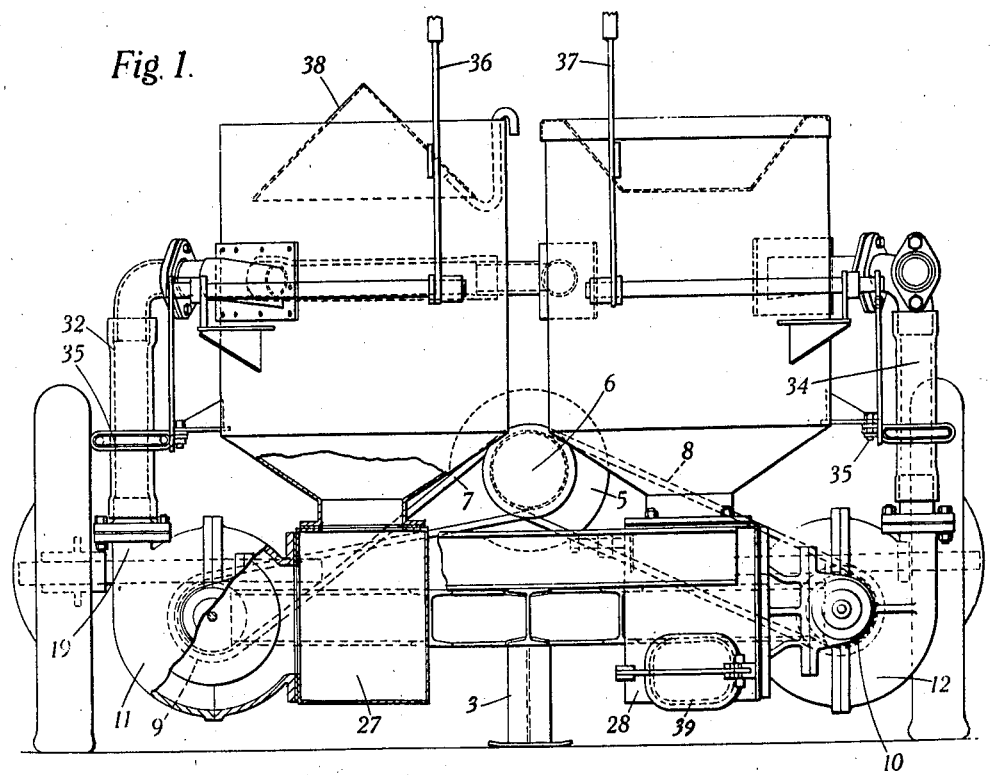

April 13, 1943.  J. S. MORGAN ET AL  2,316,705
PRODUCTION OF FLUENT CEMENT OR CEMENT GROUT
Filed Nov. 5, 1940  3 Sheets-Sheet 1

April 13, 1943.   J. S. MORGAN ET AL   2,316,705
PRODUCTION OF FLUENT CEMENT OR CEMENT GROUT
Filed Nov. 5, 1940   3 Sheets-Sheet 2

April 13, 1943.   J. S. MORGAN ET AL   2,316,705
PRODUCTION OF FLUENT CEMENT OR CEMENT GROUT
Filed Nov. 5, 1940   3 Sheets-Sheet 3

Inventors:
J. S. Morgan
J. C. Gammon
H. S. Morgan
By: Mason, Porter
Attorneys

Patented Apr. 13, 1943

2,316,705

UNITED STATES PATENT OFFICE 2,316,705

PRODUCTION OF FLUENT CEMENT OR CEMENT GROUT

John Stanley Morgan, Rodridge Hall, near Wingate, John Charles Gammon, London, and Harry Stuart Morgan, Rochester, England Application November 5, 1940, Serial No. 364,454
In Great Britain November 7, 1939

7 Claims. (Cl. 259—146)

The present invention relates to the production of fluent cement or cement grout for use in the preparation of concrete.

In British Patent No. 328,030 there has been described a process of making a fluent cement for the manufacture of concrete by vigorously agitating the cement with water in a disintegrator preferably operated at high speed with or without a vacuum to remove air from the particles.

In British Patent No. 412,556 there has been described the manufacture of fluent cement grout by first mixing cement, water and sand or other fine mineral filler, and then subjecting the mixture to intensive mixing between closely adjacent surfaces not in grinding contact but in rapid relative movement.

It is one object of the present invention to improve the mixing of cement powder with the slurry. It is a further object of the invention to economise power which would otherwise be dissipated in the grinding of the sand, which is an unnecessary operation and leads to harmful wear and tear of the apparatus. Other objects will be apparent from the appended description and claims.

In mixing a powder, such as cement, with water by processes and/or in apparatus of the above type it has now been found in practice that after a certain amount of powder has been added to the water, the apparent density becomes so high that any new powder now floats on the surface and cannot be mixed with the slurry unless a preliminary mixing is arranged.

This limits the usefulness of the process, for it is very frequently necessary to mix more powder than can be effected with the direct process. The present invention describes means whereby the preliminary mixing may be effected.

According to the present invention, the slurry is circulated and a forced vortex is produced by tangential admission of the slurry to a container or hopper situated above a colloid mill (for the fluent cement) or a mixer (for the cement grout).

Above the colloid mill or mixing machine is provided a cylindrical hopper, large enough to contain the whole charge which it is desired to use. The hopper has a tangential inlet connected with the outlet of the mixing machine, and is provided with a bottom outlet, connected to the inlet of the machine. Means is provided to cause the slurry to circulate through the mixer.

The colloid mill may consist of at least one pair of closely adjacent surfaces, not in grinding contact but in rapid relative motion. Preferably the closely adjacent surfaces are those of a disc or rotor and a stationary surface, preferably also both faces of the disc are employed, the machine consisting of a volute casing and means to admit slurry to both sides of the disc, the mill acting as its own circulating pump.

The mill is rotated at a high speed (1,500 R. P. M.) giving a peripheral speed of about 4500 ft. per min. The liquid which is to be used is poured into the hopper and rapidly circulated through the mill and hopper, forming a forced vortex. The solid powder is introduced to the hopper over the apex of a cone which is fixed to the open top of the hopper, and is so caused to fall as a shower or curtain into the swirling liquid. It is carried down and pre-mixed on its way to the mill.

According to a further feature of the present invention the cement is first mixed with the water under conditions of intensive mixing and the relatively coarse sand or the like is then mixed with the dispersion thus obtained under less intensive conditions. By intensive mixing is meant mixing such as can be obtained in a colloid mill and capable of yielding a cement water mixture having the properties described in Patent No. 328,030. The less intensive mixing may be carried out in a mixing machine having paddles, beaters or impellers and the second mixer may act as a centrifugal pump, to deliver the finished grout under pressure through a pipe to the work.

In any very fine mineral filler, of a fineness comparable with that of cement is added, this may if desired be added together with the cement to the first mixer.

According to a still further feature of the invention, cement grout is produced by first intensively mixing 1 cwt. of cement with 6¼-8 Imperial galls. of water, and then 1-1½ cwt. of sand is mixed therewith under less intensive conditions.

The invention depends upon the fact that when cement is thoroughly mixed with water in the first machine, each particle of cement is split off from its neighbours and is separately suspended in the water. This tends to stop any sedimentation of the cement and greatly increases the apparent density of the liquid. If now sand is thoroughly mixed with this cement grout so that each particle of sand is distributed it is found that there is again little tendency for the sand to separate and the whole will set as one mass without the separation of water to any appreciable extent.

Now, the specific surface of cement, i. e. the total surface exposed of all particles in a unit volume is about 1800. This specific surface is readily calculable, assuming the grains are spherical, and equal $\pi/d$ where $d$ is the average grain diameter. Suppose therefore, the sand passes a 10 mesh sieve, the maximum diameter will be $\frac{1}{10}$ inch and the average may be $\frac{1}{20}$ inch. This would mean a specific surface of $20\pi$, say about 60. It has been found that to wet the cement which has a specific surface of 1800, is a much more important consideration than wetting the sand with a surface of 60.

We therefore proceed as below: Two separate mixers are provided, driven preferably off one shaft. In one a high speed disintegrator cement and water is mixed alone. The mixture is transferred to the second mixer where the sand is added. In the second mixer no such intensive mixing is provided for, but complete distribution of the sand through the mass is simply ensured. Consequently there are no rapidly moving adjacent surfaces.

We may inundate the sand to simplify measurement and feed it in this condition, cutting down the water in the first mixer to compensate for the water introduced by the inundated sand.

By operating in this manner the strength of the concrete made by the process described can be greatly increased.

The strength of concrete increases according to an exponential formula as the water-cement ratio diminishes. Obviously this ratio must be kept at a minimum. It can be reduced considerably by mixing the water and cement alone, for by avoiding the break-up of sand, the necessary fluidity for grouting may be obtained with less total water.

It has been customary to make certain additions to concrete to obtain particular properties, thus, for example calcium chloride is added in frosty weather. Such conditions can be made either in the first mixer when the most positive results are obtained, or in the second mixer where a delayed action ensues. This gives a flexibility hitherto not obtainable.

The sand may be added in a mixing machine similar to the one described above. The cement and water may be fed to the mixer continuously, and withdrawn into the second mixer at an appropriate rate into which a continuous stream of sand is fed.

The machine described will mix 1 cwt. of cement in 30 seconds. As soon as mixing is complete, the circulation is stopped and the liquid is transferred to the work, being pumped to the site of application by the impeller.

Figure 2:
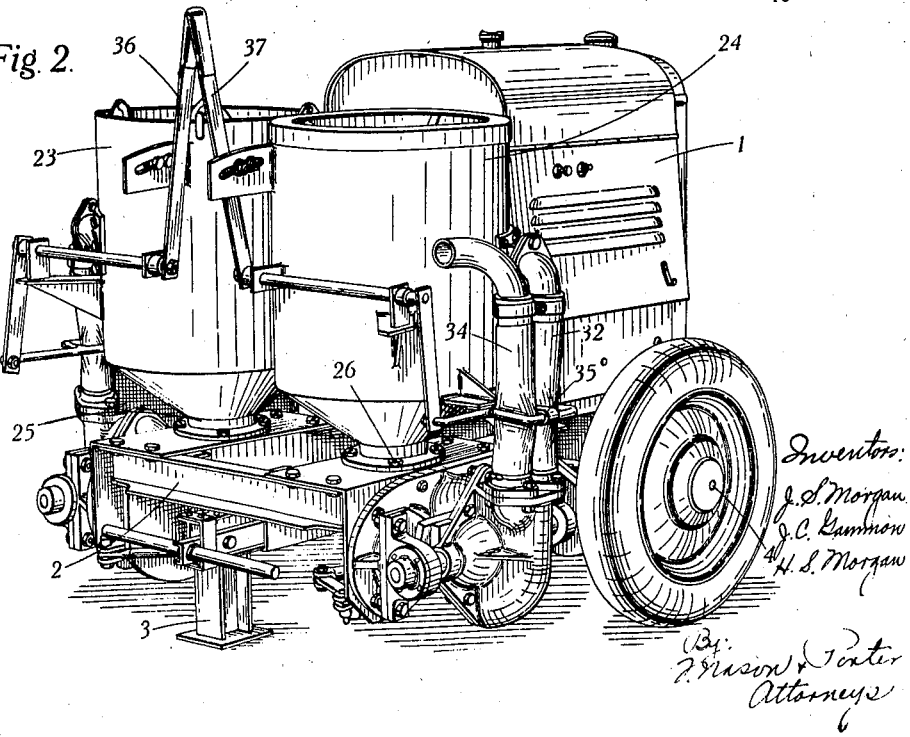
Figure 3:
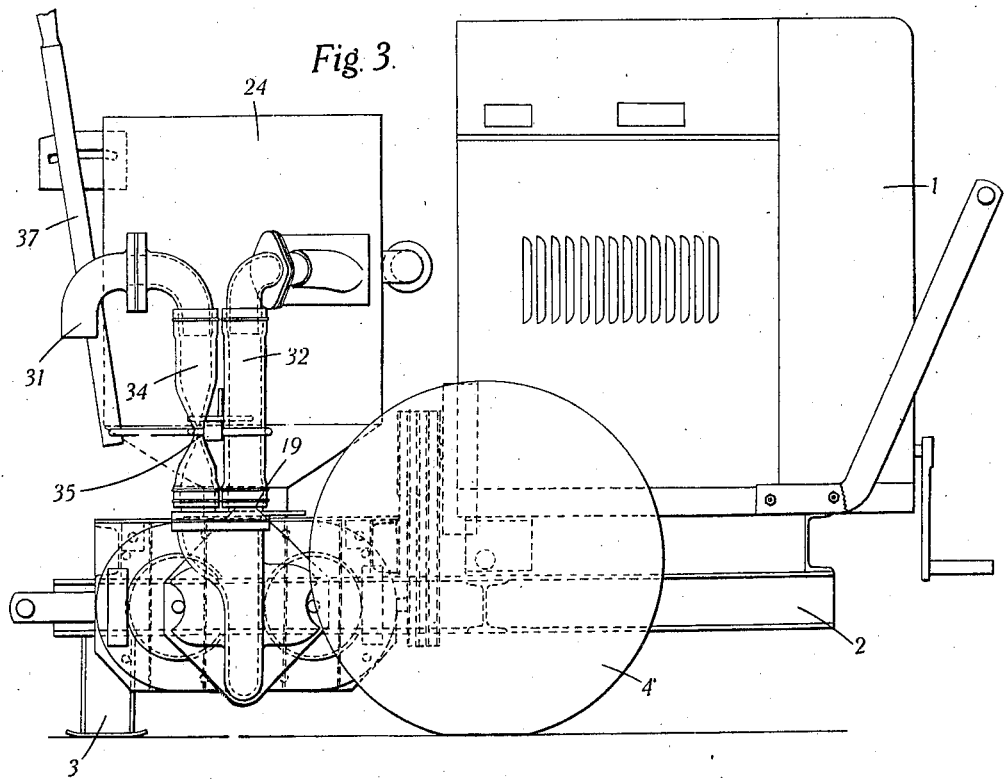
Figure 4:
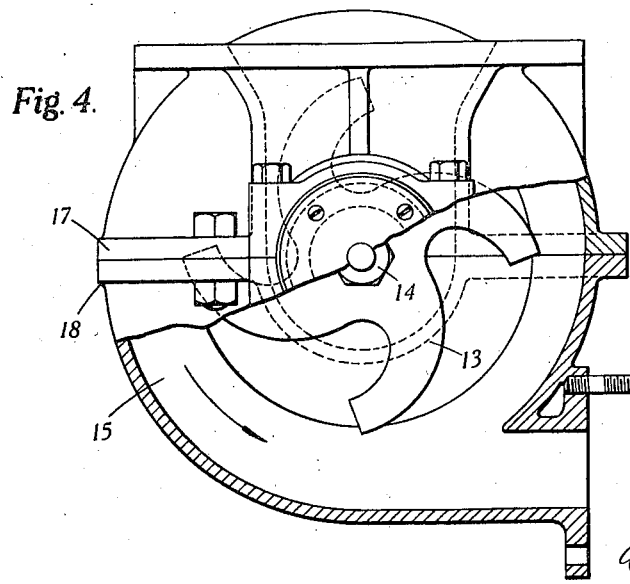
Figure 5:
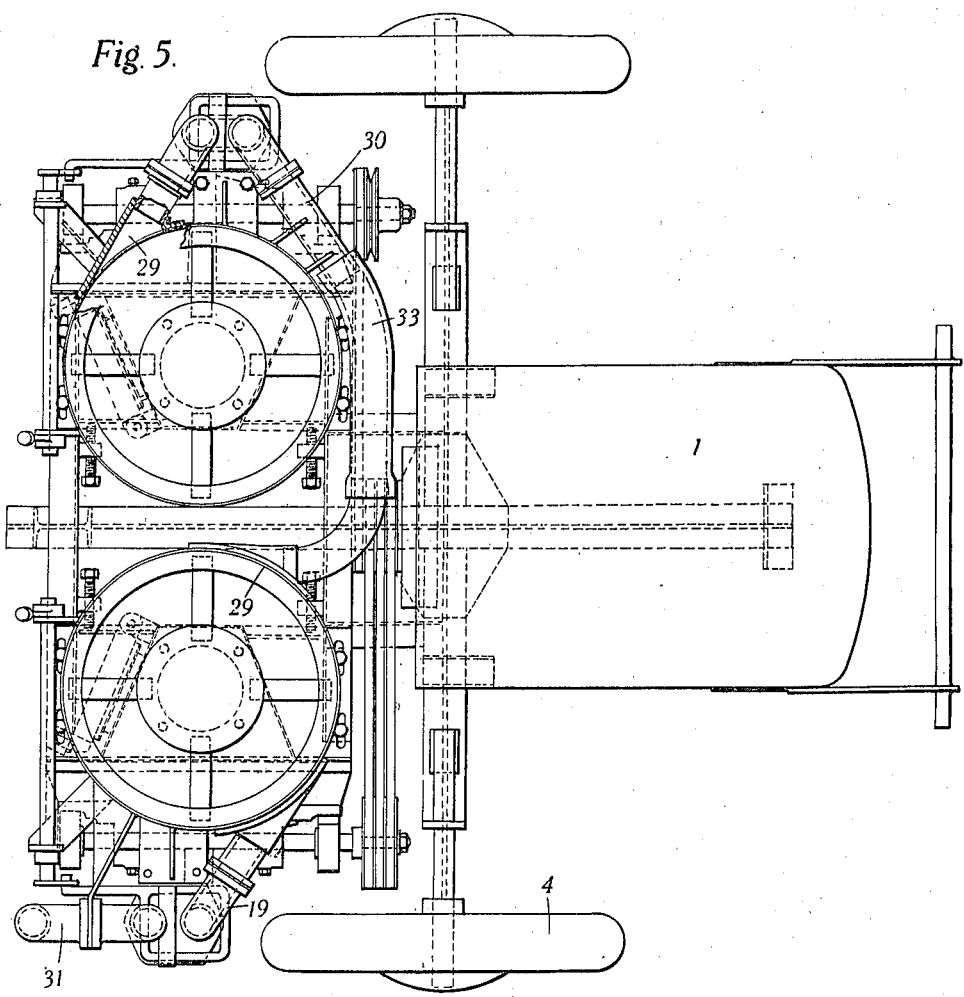
Figure 6:
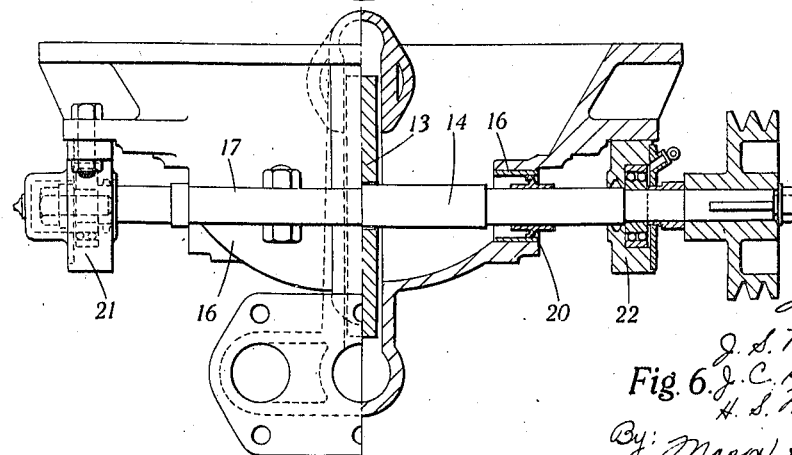

A preferred embodiment of a machine for carrying out the above processes is shown in the accompanying drawings of which:

Figure 1 is an end elevation of the machine,
Figure 2 is a perspective view,
Figure 3 is a side elevation,
Figure 4 a detail of the sand mixer,
Figure 5 a plan view of the machine, and
Figure 6 another detail of the sand mixer.

The apparatus consists of a power unit 1 mounted on a chassis 2, having a shoe 3 acting as a support and wheels 4. The flywheel 5 of the power unit has a double pulley 6 mounted thereon which drives the respective mills 11, 12 by means of belts 7, 8 and pulleys 9, 10.

The mill 11 consists of a disc fitted slackly on a shaft, and revolving with a clearance of about ⅛" on either side of the disc between plates. The disc centres itself.

The mill 12 consists of a swastika shaped rotor 13 mounted on a shaft 14 (Figures 4 and 6) and revolving in a casing 15 comprised of two halves 17, 18. A bush 16 carries the shaft through the casing. This bush contains a rubber seal 20. The volute shaped casing has an outlet pipe 19. 21 and 22 are ball bearings supporting shaft 14. The arrangement of the mill 11 is similar except that the rotor is a disc.

23, 24 are mixing hoppers. The liquid slurry circulates through the outlets 25, 26, the traps 27, 28 (described below) the mills 11, and 12, the outlet pipes 19 from the mixers, and back through the tangential nozzles 29 into the tanks 23, 24.

The slurry passes through pipe 30 from one mixer to the other, 31 is an outlet pipe.

The pipes 19, 30, 31 are interrupted and consist as to their middle portions of wide rubber hose which are adapted to be clipped by clips 35, actuated by levers 36, 37 so arranged that when one tube is compressed the other is automatically opened.

A cone 38 is placed at the upper end of hopper 23.

In the case of cement in spite of the fact that fine grinding is called for, it always happens that tramp iron derived from the grinding balls is present. It is clear that such tramp iron will cause a stoppage of the mill unless removed. This may be done by causing the slurry to turn through an angle before entering the mill, when the tramp iron collects in the sumps 27, 28 and may be removed through door 39.

While one side of the rotor only in the mills may be used, but it is preferred to use both. The sumps 27, 28 are in the form of boxes with the hopper attached to a circular hole in the top and the mill attached to a longitudinal opening in the side wall thereof, the rotor operating in a central position relative to this opening. In the appended claims by "intensive mixing" we mean mixing in a high speed colloid mill.

We declare that what we claim is:

1. An apparatus for making fluent cement grout comprising a hopper, a colloid mill, a connection so arranged as to circulate a cement-water slurry between said hopper and said mill, means to supply cement to said hopper, a second hopper, a connection between said colloid mill and said second hopper, means whereby when said second connection is opened, said first connection is closed and vice versa, means to supply sand to said second hopper, a paddle mixer, means to circulate a slurry of cement, sand and water between said second hopper and said mixer, means to draw off said slurry from said mixer, and means whereby when said circulation means is open, said drawing off means is closed, and vice versa.

2. A process for the production of fluent cement grout which consists in circulating a slurry of cement and water, causing a forced vortex in a body of said slurry by tangentially injecting said circulating slurry, effecting a preliminary mixing of cement with said slurry in said vortex, thereafter submitting the mixture to intensive mixing, leading off a portion of said slurry after mixing, circulating said portion in a second circuit, causing a second forced vortex in further body of slurry by tangentially injecting slurry from said second circuit, effecting a preliminary mixing of sand with said slurry in said second vortex, thereafter submitting the mixture to a more intimate mixing, and drawing off a portion of said mixture for use.

3. The process of making fluent cement which comprises causing a forced vortex to occur in a body of slurry consisting of cement and water, allowing cement to fall as a curtain into said vortex, effecting a preliminary mixing of cement with said slurry in said vortex, and thereafter intensively mixing said cement and water slurry.

4. The process of making fluent cement which consists in circulating a slurry consisting of cement and water, causing a forced vortex to occur in a body of said slurry by tangentially injecting said circulating slurry, causing cement to fall as a curtain into said vortex, effecting a preliminary mixing of cement and water in said vortex, thereafter submitting the mixture to an intensive mixing.

5. The process of making fluent cement which comprises circulating a slurry consisting of cement and water, causing a forced vortex to occur in a body of the slurry by tangentially injecting said circulating slurry, allowing cement to fall as a curtain into said vortex, effecting a preliminary mixing of cement with said slurry in said vortex, and thereafter submitting said mixture to intensive mixing between two surfaces in rapid relative rotation.

6. The process of making a fluent cement grout which comprises causing a forced vortex to occur in a body of slurry consisting of cement and water, allowing cement to drop as a curtain into said vortex, effecting a preliminary mixing of cement with said slurry in said vortex, subjecting the said mixture to an intensive mixing and thereafter mixing sand therewith under less intensive conditions.

7. The process of making a fluent cement grout which comprises circulating a slurry consisting of cement and water, causing a forced vortex to occur in a body of said slurry, by tangentially injecting said circulating slurry, allowing cement to fall as a curtain into said vortex, effecting a preliminary mixing of said current with said slurry in said vortex, then submitting the slurry to an intensive mixing between two rapidly rotating surfaces, and thereafter mixing relatively coarse sand therewith under less intensive conditions.

J. S. MORGAN.
J. C. GAMMON.
H. S. MORGAN.